Figure 1:
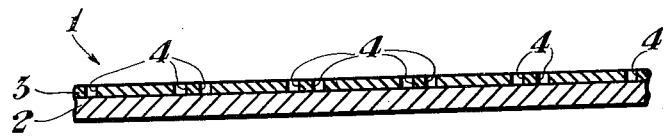

Dec. 25, 1956 L. K. HEDDING 2,775,023
MANUFACTURE OF SMALL RECTIFIER CELLS
Filed May 21, 1952 2 Sheets-Sheet 1

INVENTOR.
Linnie K. Hedding
BY W. H. Stout
HIS ATTORNEY

Dec. 25, 1956  L. K. HEDDING  2,775,023
MANUFACTURE OF SMALL RECTIFIER CELLS
Filed May 21, 1952  2 Sheets-Sheet 2

INVENTOR.
Linnie K. Hedding
BY W. L. Stout
HIS ATTORNEY

United States Patent Office 2,775,023
Patented Dec. 25, 1956

2,775,023

MANUFACTURE OF SMALL RECTIFIER CELLS

Linnie K. Hedding, Wilkinsburg, Pa., assignor to Westinghouse Air Brake Company, Wilmerding, Pa., a corporation of Pennsylvania Application May 21, 1952, Serial No. 289,073

2 Claims. (Cl. 29—25.3)

My invention relates to the manufacture of dry disc rectifier cells, and particularly to the manufacture of humidity resistant rectifier cells.

It has been found that dry disc rectifier cells, particularly those employing a ferrous base plate, deteriorates when exposed to humid conditions. The deterioration of such rectifier cells is frequently the result of corrosion or chemical changes which take place along the edges of the rectifier cells where the rectifying or barrier layers are exposed. Various expedients have been tried in the past to overcome the deleterious effects of humid conditions. One such expedient is the use of a hermetically sealed enclosure for the rectifier cells. Another expedient is the use of a noncorrosive base plate for the rectifier cells, as for example an aluminum base plate. Plating the corrosive base plate with a noncorrosive metal such as nickel is also used in ameliorating the humidity effects on dry disc rectifiers.

While such expedients have proven satisfactory in some respects in providing a humidity resistant rectifier cell, another method of doing this is to provide a cell in which the edges of the rectifying or barrier layer of the cell are protected from the humid ambient conditions during operation, so that they do not deteriorate under such adverse operating conditions.

It is an object of my present invention to provide a method of manufacturing dry disc rectifier cells whereby the edges of the rectifying or barrier layer of the resulting cells are protected against the effects of humid conditions.

Another object of my invention is to provide a mass production method of manufacturing dry disc rectifier cells which are humidity resistant.

In carrying out my invention a metal plate or strip of suitable dimensions is coated with a layer of a semi-conductor material such as selenium. The semi-conductor material is then removed from areas or regions surrounding areas of the semi-conductor layer, thereby providing a plurality of individual rectifier cells which are subsequently punched from the metal base or strip. The regions from which the semi-conductor layer is removed are then filled with an insulating compound highly resistant to moisture. The semi-conductor layer is next processed in the usual manner, a counterelectrode layer deposited or sprayed on the semi-conductor layer, and the rectifying element formed.

The individual rectifier cells are then punched from the metal plate or strip with a suitable punching die, the individual cells being severed only in those regions where the semi-conductor layer had been replaced by the insulating compound. The edges of the rectifying or barrier layers of the resulting rectifier cells are thus protected by a ring of insulating compound.

Other objects and characteristic features of my invention will become apparent as the description proceeds.

I shall describe two methods embodying my invention for manufacturing rectifier cells, and shall then point out the novel features thereof in claims.

Figure 2:
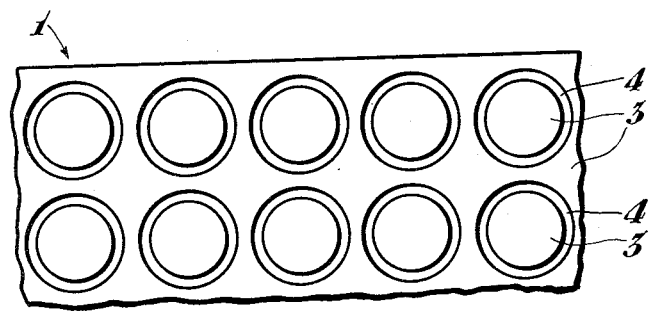
Figure 3:
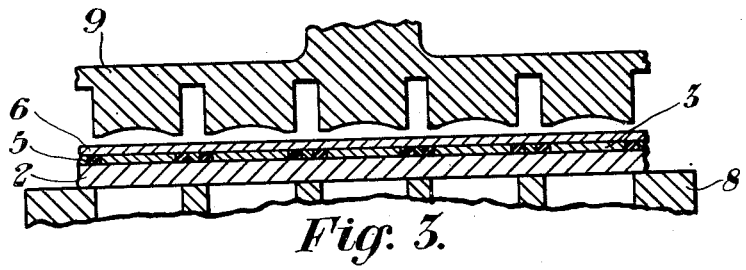
Figure 4:
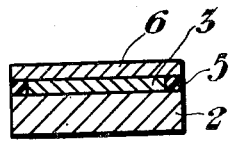
Figure 5:
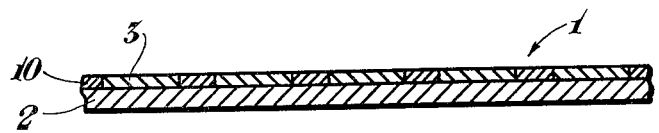
Figure 6:
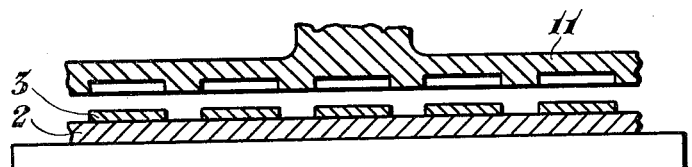
Figure 7:
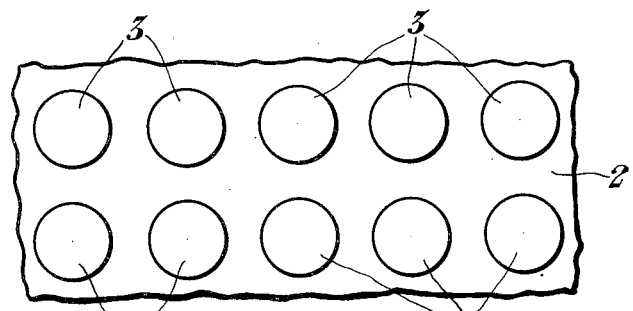
Figure 8:
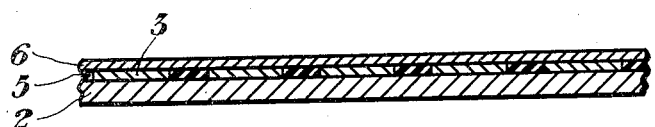

In the accompanying drawings, Fig. 1 is a longitudinal sectional view of a plate or strip with a semi-conductor layer deposited thereon, narrow regions of the layer having been subsequently removed to form a plurality of desired areas of the semi-conductor layer. Fig. 2 is a top plan view of the plate or strip illustrated in Fig. 1. Fig. 3 is a longitudinal section of a formed strip ready for the punching operation. Fig. 4 is a sectional view of a resulting rectifier cell. Fig. 5 is a longitudinal sectional view of a plate or strip illustrative of another method of applying the semi-conductor layer to the plate or strip. Fig. 6 is a longitudinal sectional view of a prepared strip as illustrated in Fig. 5 together with a recessed platen and support. Fig. 7 is a top plan view of the strip or plate illustrated in Fig. 5, while Fig. 8 is a longtiudinal sectional view of the plate or strip ready for the punching operation.

Referring now to Figs. 1 to 4 of the drawings, a plate or strip 1 comprises a metal base plate 2 which may be of a ferrous metal. Deposited on the base plate 2 is a layer 3 of a semi-conductor material such as selenium. The semi-conductor layer may be deposited or pressed onto the base plate 2 by any of the well-known methods, the selenium being in its crystalline or conductive state. Regions or areas 4 of the semi-conductor layer are then removed from the base plate as for example by a suitable cutting tool. The regions or areas 4 bound areas of the semi-conductor layer which are subsequently punched from the base plate. In the accompanying drawings, I have illustrated the desired areas as being circular, the regions 4 being cut out by a barrel saw or similar tool. It will be understood that my process is not necessarily limited to the manufacture of circular discs, that square, rectangular or other forms of rectifier cells may be made by my process.

After the narrow regions or areas 4 have been cut out, these regions are filled with an insulating compound 5 which is highly resistant to moisture. In considering the particular type of compound to use, consideration must be given to the bonding characteristics of the compound selected, its possible chemical reaction with the semi-conductor layer, and the temperature at which such selected compound is baked or cured. Baking or curing temperatures for the insulating compound selected should not be above 200° F., otherwise the semi-conductor layer 3 may be adversely affected. In addition to the usual insulating varnishes and lacquers which give satisfactory results and which in some instances need only be air dried, many potting compounds and casting resins such as polystyrenes, polyester styrenes and polyethylene compounds may be used to manufacture the humidity resistant rectifier cells in accordance with my methods.

When the narrow regions 4 have been filled with the insulating compound 5 and the compound properly cured, the strip 1 is then processed in any suitable manner to complete a rectifying element, it being understood that my invention is not limited to any particular method of processing the rectifying element. After the insulating compound 5 is properly cured, I develop the rectifying or barrier layers on the semi-conductor layer 3 by dipping the plate 1 in a sodium hydroxide solution in accordance with the methods described in Letters Patent of the United States No. 2,266,922 issued to Leslie Ernest Thompson et al. on December 23, 1941, for Manufacture of Alternating Current Rectifiers. I thereafter apply a counterelectrode layer 6 of suitable metal, as for example, a tin-cadmium alloy, in intimate contact with the semi-conductor layer 3. The usual method of applying the counterelectrode layer is to spray the metal over the semi-conductor layer 3. In carrying out my process, the insulating compound strips are also covered with the counterelectrode metal. The rectifying element is then completed by forming the semi-conductor layer 3. I prefer to electroform the layer 3 by the methods described in Letters Patent of the United States No. 2,510,322 issued to Robert E. Shearer on June 6, 1950, for Selenium Rectifiers.

The strip 1 is now ready for the punching operation whereby individual rectifier cells 7 (Fig. 4) are punched from the strip. The strip 1 is supported on a suitable base 8 and a multi-unit punch die 9 is used to punch out the individual cells. The die 9 is preferably recessed so that no portion of the die except the cutting edges will engage the counterelectrode layer 6. The cutting edges of the die are so arranged and constructed that the individual cells will be severed from the strip 1 only in those regions filled with the insulating compound 5. The semi-conductor layer 3 is not touched by any part of the die, nor preferably is any pressure exerted thereon by the die. While I have indicated in the drawings that the individual cells may be punched from the sheet 1 from the counterelectrode side, it will be understood that the cells may be punched out from the base plate side, suitable provisions being made in the supporting member and die that the semi-conductor layers of the finished cell are not damaged by pressure exerted on them during punching.

The individual rectifier cell 7 illustrated in Fig. 4 is protected by a narrow band of insulating compound 5 which adheres to the base plate 2, the outer edges of the semi-conductor layer 3 and the underside of the counterelectrode layer. In this way the edges of the rectifying or barrier layer between the semi-conductor and counter-electrode layers are protected from humid ambient conditions which in the past deteriorated the rectifier cells made by other methods.

Although I have described a method of manufacturing humidity resistant rectifier cells from a strip on which I have provided raised semi-conductor layers and then filled in the intervening regions with an insulating compound resistant to moisture, humidity resistant cells may also be manufactured from a rectifier strip which is completely processed. In this instance, the counterelectrode layer and semi-conductor layer are removed in the manner described and the regions from which the layers are removed filled in with the insulating compound. The individual rectifier cells may then be punched out in the manner described.

In Figs. 5 through 8, I have illustrated another embodiment of my invention which is quite similar to the method already described. In this method I use a mask 10 of suitable material which I dispose upon the base plate 2. The mask 10 is in the form of a grid with open spaces respresentative of the desired shape and approximate size of the rectifier cell. The semi-conductor layer 3 may be deposited on the base plate 2 in any well-known manner through the openings in the mask 10. While such a layer may be deposited by vaporization, the semi-conductor layer may be applied to the base plate in the form of a powder. The mask 10 is then carefully lifted and the semi-conductor layer material converted from its amorphous state to its metallic state by pressure and heat. A heated platen 11 may be used, the platen being recessed to conform to the desired areas of the individual rectifier cells to provide raised semi-conductor layers 3 on the base plate. The intervening regions 4 between the semi-conductor layers are then filled in with the insulating compound 5. The strip 1 is then processed to complete the rectifier elements in the manner described, the individual cells being punched from the strip in the regions filled by the insulating compound 5.

In place of the recessed platen 11, a flat platen may be used in converting the semi-conductor layer 3. When a flat platen is used, the mask 10 remains in place during the annealing operation, the mask being carefully removed after the conversion of the semi-conductor layer. The intervening regions between the raised semi-conductor layers are then filled in with the insulating compound and the strip processed as herein described.

One of the advantages of manufacturing dry-disc rectifier cells in accordance with my methods is the minimizing changes in the electrical characteristics of the rectifier cell during the punching operation. By using a die relieved at its center so that only the cutting edge engages the counterelectrode layer and the insulating compound, pressure is restricted to the regions filled with the insulating compound. Another advantage of my methods is that the resulting rectifier cells may be mounted in open type housings with little or no need of painting or other protection against humidity.

Although I have herein illustrated and described several methods for manufacturing dry-disc rectifier cells embodying my invention, it is understood that various changes and modifications may be made therein within the scope of the appended claims without departing from the spirit and scope of my invention.

Having thus described my invention, what I claim is:

1. The method of manufacturing selenium rectifier cells comprising the steps of providing a layer of selenium in its crystalline state on a base plate, removing the selenium layer from regions surrounding predetermined areas of the layer, filling in the regions where the selenium layer was removed with an insulating compound resistant to moisture, forming a barrier layer on said selenium layer, applying a counterelectrode layer to the selenium layer and the insulating compound, electroforming the selenium layer, and then subdividing the base plate in the regions filled with the insulating compound to produce a plurality of individual rectifier cells.

2. The method of manufacturing selenium rectifier cells comprising the steps of depositing a layer of conductive selenium on a base plate, removing the selenium layer from regions surrounding predetermined areas of the selenium layer, filling in the regions where the selenium layer was removed with an insulating compound resistant to moisture, forming a barrier layer on the selenium layer, applying a counterelectrode layer to the selenium layer and the insulating compound, electroforming the selenium layer, and then subdividing the base plate to produce a plurality of rectifier cells by a punching operation in which the cutting edge of the punch passes through the counterelectrode layer, the regions filled with the insulating compound, and the base plate.

References Cited in the file of this patent

UNITED STATES PATENTS

| | | |
|---|---|---|
| 2,444,473 | Skinker et al. | July 6, 1948 |

FOREIGN PATENTS

| | | |
|---|---|---|
| 120,843 | Australia | Jan. 24, 1946 |
| 121,005 | Australia | Feb. 28, 1946 |